US012682310B2

(12) United States Patent
Shayne et al.

(10) Patent No.: US 12,682,310 B2
(45) Date of Patent: Jul. 14, 2026

(54) FETCHING AND GUARDING PACKAGES USING DRONES

(71) Applicant: ObjectVideo Labs, LLC, Tysons, VA (US)

(72) Inventors: Ethan Shayne, Clifton Park, NY (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 136 days.

(21) Appl. No.: 18/483,963

(22) Filed: Oct. 10, 2023

(65) Prior Publication Data

US 2024/0127164 A1      Apr. 18, 2024

Related U.S. Application Data

(60) Provisional application No. 63/415,695, filed on Oct. 13, 2022.

(51) Int. Cl.
G06Q 10/0833      (2023.01)
G05D 1/00      (2024.01)
G06Q 10/083      (2024.01)

(52) U.S. Cl.
CPC ......... G06Q 10/0833 (2013.01); G05D 1/101 (2013.01); G06Q 10/0838 (2013.01)

(58) Field of Classification Search
CPC . G06Q 10/0833; G06Q 10/0838; G05D 1/101
See application file for complete search history.

(56) References Cited

U.S. PATENT DOCUMENTS

| | | | |
|---|---|---|---|
| 2017/0236193 A1 | 8/2017 | Zundel et al. | |
| 2020/0394605 A1* | 12/2020 | Daley ............... | G06Q 10/0635 |
| 2022/0129829 A1* | 4/2022 | Pourteymour ..... | G07C 9/00182 |
| 2023/0165395 A1* | 6/2023 | Ieradi ................ | G06Q 10/0836 232/44 |
| 2023/0169447 A1* | 6/2023 | Vaidyanathan ...... | G06Q 10/083 705/7.28 |
| 2024/0193533 A1* | 6/2024 | Gustafsson ........ | G06Q 10/0833 |

OTHER PUBLICATIONS

Christopher A. Boone, Cargo theft in the motor carrier industry: an exploratory study, 2016, p. 57-58 (Year: 2016).*

* cited by examiner

*Primary Examiner* — Ibrahim N El-Bathy
(74) *Attorney, Agent, or Firm* — Fish & Richardson P.C.

(57) ABSTRACT

Methods, systems, and apparatus, including computer programs encoded on computer storage media, for fetching and guarding delivered packages using robots. One of the methods includes: determining a characteristic of a package at a first location; determining a risk score for the package at the first location; determining, using the risk score and the characteristic of the package, to perform an action for the package; in response to determining to perform the action for the package, assigning a robot to perform the action; and deploying the robot to perform the action.

20 Claims, 4 Drawing Sheets

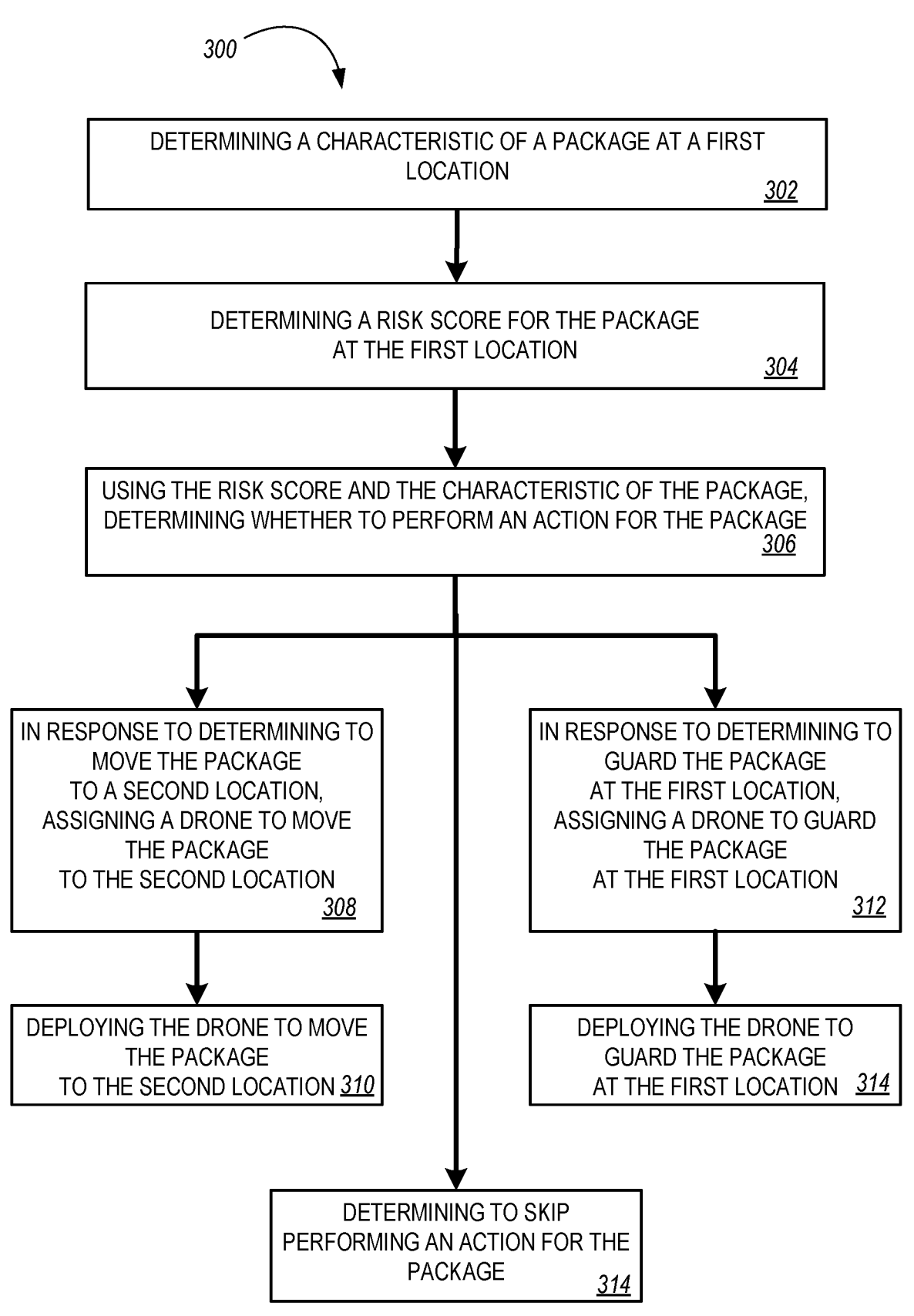

*300*

DETERMINING A CHARACTERISTIC OF A PACKAGE AT A FIRST LOCATION
*302*

DETERMINING A RISK SCORE FOR THE PACKAGE AT THE FIRST LOCATION
*304*

USING THE RISK SCORE AND THE CHARACTERISTIC OF THE PACKAGE, DETERMINING WHETHER TO PERFORM AN ACTION FOR THE PACKAGE
*306*

IN RESPONSE TO DETERMINING TO MOVE THE PACKAGE TO A SECOND LOCATION, ASSIGNING A DRONE TO MOVE THE PACKAGE TO THE SECOND LOCATION
*308*

IN RESPONSE TO DETERMINING TO GUARD THE PACKAGE AT THE FIRST LOCATION, ASSIGNING A DRONE TO GUARD THE PACKAGE AT THE FIRST LOCATION
*312*

DEPLOYING THE DRONE TO MOVE THE PACKAGE TO THE SECOND LOCATION *310*

DEPLOYING THE DRONE TO GUARD THE PACKAGE AT THE FIRST LOCATION  *314*

DETERMINING TO SKIP PERFORMING AN ACTION FOR THE PACKAGE
*314*

FIG. 3

FETCHING AND GUARDING PACKAGES USING DRONES

CROSS-REFERENCE TO RELATED APPLICATION

This application claims the benefit of U.S. Provisional Application No. 63/415,695, filed Oct. 13, 2022, and titled "Fetching and Guarding Packages Using Drones," which is incorporated by reference.

TECHNICAL FIELD

This disclosure application relates generally to monitoring systems.

BACKGROUND

Some properties are equipped with monitoring systems that include sensors and connected system components. Monitoring systems can receive and analyze data from sensors that are internal and external to the property. Some monitoring systems include cameras. Some monitoring systems include drones. Delivery services can deliver packages to a property.

SUMMARY

Techniques are described for fetching and guarding delivered packages using drones, e.g., to reduce a risk of theft or damage. Cameras can be installed at a property, such as a doorbell camera that is installed at a door of a property, and can capture video images. Video images captured by the camera can include images of packages delivered to the property, of packages awaiting pickup from the property, or both.

A monitoring system can analyze images captured by the camera and assess the risk to the package. For example, the monitoring system can estimate a risk to the package due to environmental effects such as weather conditions. The monitoring system can estimate a risk to the package due to theft or interference by animals or people.

Based on the estimated risk to the package, the monitoring system can determine whether to perform an action for the package. For example, the monitoring system can determine to move the package from a dropoff location to a second location. For example, the monitoring system can determine to move the package from a dropoff location that is exposed to weather elements to a second location that is protected from weather elements. In some examples, the monitoring system can determine to move the package from a dropoff location that is not within a field of view of an installed camera to a second location that is within the field of view of an installed camera. In some examples, the monitoring system can determine to move the package from a dropoff location that is accessible by a passerby to a second location that is not accessible or less accessible to a passerby. In some examples, the monitoring system can determine to leave the package at the dropoff location, and to monitor and/or guard the package at the dropoff location.

When the monitoring system determines to perform an action for the package, the monitoring system can assign a drone or another type of robot to perform the action. For example, the monitoring system can assign a drone to scout the location of the package, to monitor the package, to guard the package, to move the package, or any combination of these. Although this specification generally refers to drones, any reference to a drone also applies to other types of robots, e.g., land based robots.

In some examples, the monitoring system is configured to communicate with a set of drones. The monitoring system can select to assign a particular drone of the set of drones based on capabilities and availabilities of the drones. After assigning a drone to perform an action for the package, the monitoring system can deploy the assigned drone to perform the action. In some examples, the monitoring system can deploy multiple drones for a package. For example, the monitoring system can deploy a first drone to scout the location of the package, and can deploy a second drone to guard the package. In some examples, the monitoring system can deploy a first drone to scout an alternate location for the package, and can deploy a second drone to move the package to the alternate location. In some examples, the monitoring system can deploy a first drone to scout a route from the dropoff location to an alternate location, and can deploy a second drone to move the package to the alternate location along the route.

In general, some aspects of the subject matter described in this specification can be embodied in methods that include the actions of determining a characteristic of a package at a first location; determining a risk score for the package at the first location; determining, using the risk score and the characteristic of the package, to perform an action for the package; in response to determining to perform the action for the package, assigning a robot to perform the action; and deploying the robot to perform the action.

Other implementations of these aspects include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. Determining to perform the action for the package includes determining, using the risk score and the characteristic of the package, whether to perform the action for the package to reduce at least one of a theft risk or a damage risk of the package. Determining the risk score for the package at the first location includes determining the risk score for the package using the first location and the characteristic of the package. Determining the risk score for the package includes determining a damage risk score for the package using the first location, the characteristic of the package, and weather data for the first location. Determining the risk score for the package includes determining a theft risk score for the package using the first location, the characteristic of the package, and property schedule data for a property that includes the first location. Determining the risk score for the package includes determining the risk score using a machine learning model trained on historical package data including conditions of packages from historical package deliveries or pick-ups.

Determining to perform the action for the package includes determining, using the risk score and the characteristic of the package, to move the package to a second location; assigning the robot to perform the action includes, in response to determining to move the package to the second location, assigning the robot to move the package to the second location; and deploying the robot to perform the action includes deploying the robot to move the package to the second location. Determining to perform the action for the package includes determining, using the risk score and the characteristic of the package, to guard the package at the first location; assigning the robot to perform the action includes, in response to determining to guard the package at the first location, assigning the robot to guard the package at the first location; and deploying the robot to perform the action includes deploying the robot to guard the package at the first location. Determining to perform the action for the package includes determining, using the risk score and the characteristic of the package, to monitor the package at the first location; assigning the robot to perform the action includes, in response to determining to monitor the package at the first location, assigning the robot to monitor the package at the first location; and deploying the robot to perform the action includes deploying the robot to monitor the package at the first location. Determining to perform the action for the package includes determining, using the risk score and the characteristic of the package, to scout a route for moving the package from the first location to a second location and to move the package from the first location to the second location along the route; assigning the robot to perform the action includes, in response to determining to scout the route, assigning a first robot to scout the route for moving the package from the first location to the second location and assigning a second robot to move the package from the first location to the second location along the route; and deploying the robot to perform the action includes deploying the first robot to scout the route for moving the package from the first location to the second location and deploying the second robot to move the package from the first location to the second location along the route. Assigning the robot to perform the action includes selecting the robot from a set of candidate robots using the characteristic of the package and respective characteristics of the candidate robots.

The subject matter described in this specification can be implemented in various implementations and may result in one or more of the following advantages. The disclosed systems can provide a reduction in risk to packages that have been delivered to the property. For example, the disclosed systems can reduce the risk of theft, damage, or both, to delivered packages. Packages can be moved to desired destinations at the property regardless of the location to which the package is delivered by a delivery person. Actions can be tailored to packages of different sizes, weights, values, and fragilities. The disclosed techniques can be used to monitor package conditions between package delivery and retrieval by an authorized person. The disclosed techniques can improve property appearance by moving a delivered package out of sight from passersby. The disclosed techniques can improve security by moving delivered packages out of sight when users are away from the property, giving the appearance that someone is at the property.

In some implementations, the systems and methods described in this specification can reduce a likelihood that a robot that cannot move a package will be deployed to move the package, e.g., by using predicted properties of the package to select a robot from multiple robots to deploy. The predicted properties can be represented by a package model. In some implementations, the systems and methods described in this specification can reduce power usage, e.g., by moving a package instead of deploying a drone to monitor the package. The disclosed techniques can reduce risk to a delivery person, effort expended by the delivery person, or both, by allowing packages to be delivered to a dropoff location that is safe and convenient for the delivery person. The dropoff location might not be safe for the package, might not be convenient for the recipient, or both. For example, the delivery person may prefer, or may need, to drop a package at a safe, convenient location. In some cases, the delivery person may drop off the package to a location that is outside a locked gate, and a drone can move the package inside the gate. In some cases, the delivery person may drop off the package to a location that is at the far end of an unshoveled walkway at a property, and a drone can move the package nearer to the property. In some cases, the delivery person may drop off the package at a location that is outside of a yard of the property where a pet is located, and a drone can move the package into the yard. The systems and methods disclosed herein can thus enable the delivery person to drop off the package at the safe, convenient location, while also improving safety and security of the package.

In some implementations, the systems and methods described in this specification can adapt if one or more conditions of an area that includes the package change after the package has been delivered. For example, a package might be safe and dry on the first step of the porch. But if it starts raining and the yard starts to flood, the systems and methods described in this specification can reassess the environment and can move the package to a safer location. In some examples, the package might originally be placed with the expectation that the homeowner would be home soon to collect the package. If the homeowner's plan changes and their return is delayed, the robot can move the package to a different location that may be less convenient but safer in the long-term.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

FIG. 3 is a flow diagram of an example process for fetching and guarding packages using drones.

Like reference numbers and designations in the various drawings indicate like elements.

DETAILED DESCRIPTION

Figure 1:
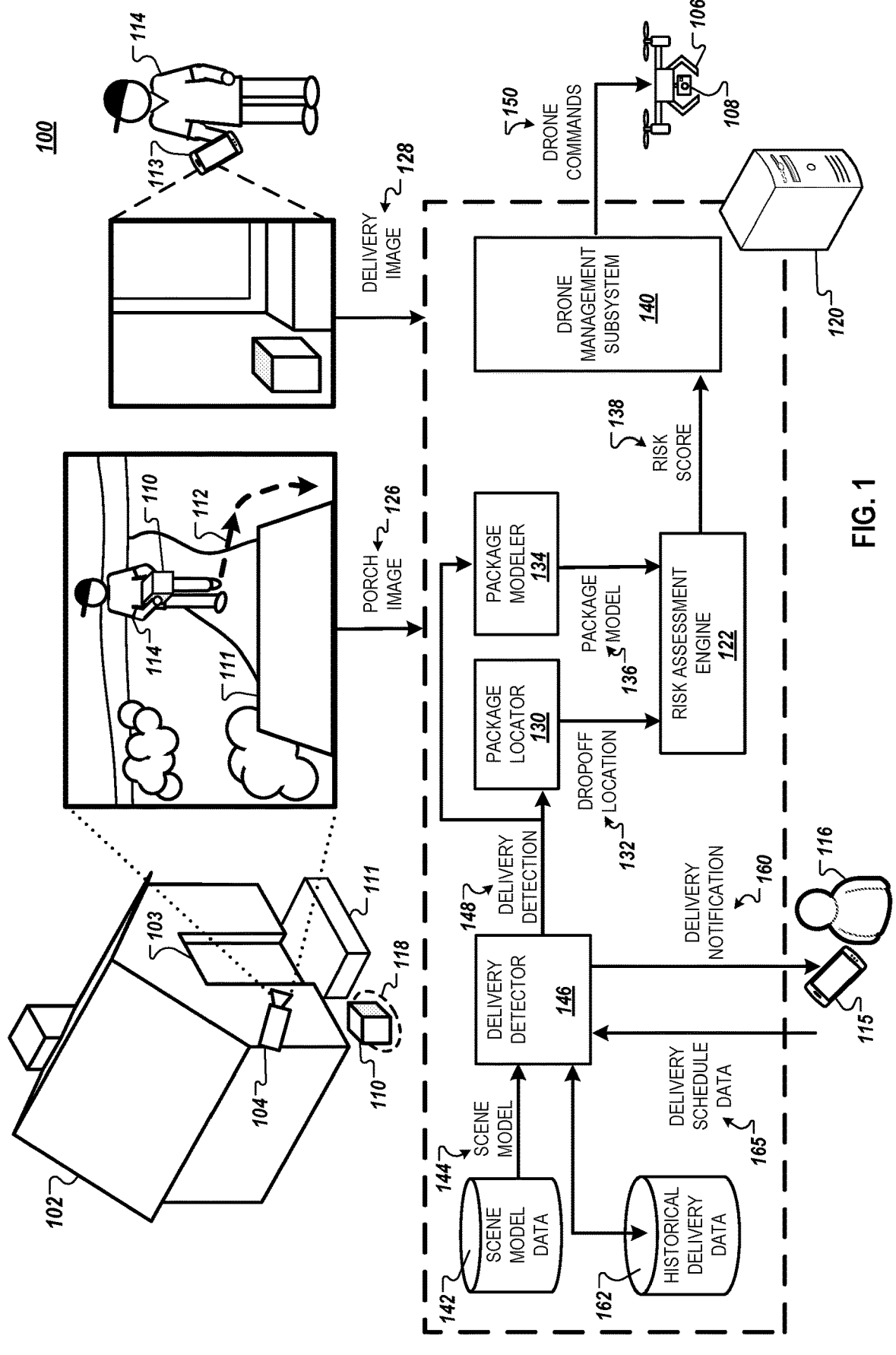
FIG. 1 illustrates an example environment for a system for fetching and guarding packages using drones.

FIG. 1 is a diagram illustrating an example environment 100 for fetching and guarding packages using drones. The environment includes a property 102 that is monitored by a monitoring system. The monitoring system includes a camera 104 installed at a property 102, a monitoring server 120, and a drone 106. The drone 106 can include one or more sensors, e.g., camera 108. The property 102 can be a home, another residence, a place of business, a public space, or another facility that is monitored by a monitoring system.

A camera 104 is installed at the property 102. The camera 104 can be, for example, a surveillance camera installed at the property 102. The camera 104 is installed external to the property 102. The camera 104 is installed near a door 103, facing a yard of the property 102. In some examples, cameras can be installed internal to the property 102. For example, cameras can be inside the property 102 near a window facing outwards with a clear view of a yard of the property 102.

The camera 104 can be integrated with a component of a monitoring system, e.g., a doorbell camera. In some examples, the camera 104 can be configured to capture video continuously. In some examples, the camera 104 can be configured to capture at designated times, such as on demand, when triggered by another sensor of the monitoring system, or when triggered by detection of object motion within a field of view of the camera 104.

The camera 104 can capture visual images of scenes at the property within the field of view. The camera 104 may perform video analysis on captured images. Video analysis can include, for example, event detection, object detection, and object classification. In some examples, the camera 104 can send image data to a computing system, e.g., a monitoring server 120, and the monitoring server 120 can perform video analysis on the captured images. In some examples, the camera 104 and the monitoring server 120 can each perform video analysis on the captured images. For example, the camera 104 can perform object detection, while the monitoring server 120 can perform object classification.

To support communications with the monitoring server 120, the camera 104 can include a communications module, such as a modem, transceiver, modulator, or other hardware or software configured to enable the camera 104 to communicate electronic data to the monitoring server 120. The camera 104 can send data to the monitoring server 120 over a long-range data link. The long-range data link can include any combination of wired and wireless data networks. For example, the monitoring server 120 can exchange information with the camera 104 through a wide-area-network (WAN), a broadband internet connection, a cellular telephony network, a wireless data network, a cable connection, a digital subscriber line (DSL), a satellite connection, or other electronic means for data transmission. In some implementations, the long-range data link between the monitoring server 120 and the camera 104 is a secure data link (e.g., a virtual private network) such that the data exchanged between the monitoring server 120 and the camera 104 is encoded to protect against interception by an adverse third party.

The monitoring server 120 can include several different functional components, including a delivery detector 146, a package locator 130, a package modeler 134, a risk assessment engine 122, and a drone management subsystem 140. The delivery detector 146, package locator 130, package modeler 134, risk assessment engine 122, drone management subsystem 140, or a combination of these, can include one or more data processing apparatuses, can be implemented in code, or a combination of both. For instance, each of the functional components can include one or more data processors and instructions that cause the one or more data processors to perform the operations discussed herein.

The various functional components of the monitoring server 120 may be installed on one or more computers as separate functional components or as different modules of a same functional component. For example, the components of the monitoring server 120 can be implemented as computer programs installed on one or more computers in one or more locations that are coupled to each through a network. In cloud-based systems for example, these components can be implemented by individual computing nodes of a distributed computing system.

The monitoring server 120 can be, for example, a remote monitoring server. The monitoring server 120 can include one or more computer systems, server systems, or other computing devices that are located remotely from the property 102 and that are configured to process information related to the monitoring system at the property 102. In some examples, the monitoring server 120 is a cloud computing platform. Although the monitoring server 120 shown in FIG. 1 receives image data from one camera installed at the property 102, the monitoring server 120 can receive image data from any number of cameras at the property 102 and can receive image data from cameras at any number of properties.

FIG. 1 illustrates a package 110 that has been delivered to the property 102 by a delivery person 114. The porch 111 is within the field of view of the camera 104. A resident 116 of the property can be located at the property 102 or at a location away from the property 102.

The example illustrated in FIG. 1 includes one camera 104 and one package 110. However, some examples can include additional cameras and/or packages. The package 110 can be, for example, a package ordered by the resident 116 from a delivery service, such as a bag of food or a box of consumer products. In some examples, the package 110 can be a package sent to the resident 116 by another person, such as a box of gifts sent to the resident 116 through a mail service.

In some implementations, the package 110 can be a package the resident 116 leaves for a pickup person, e.g., when the delivery person 114 retrieves a package from the property 102. In these implementations, the monitoring system can guard the package 110, place the package 110 in a more secure location, or a combination of both, until the pickup person comes to retrieve the package 110.

The delivery person 114 may be an employee or contractor of a delivery service organization. The delivery service organization can be, for example, an internet sales company, a shipping company, or a postal service. The delivery person 114 is a person assigned to deliver the package 110 to the property 102.

The delivery person 114 is associated with a mobile device 113. The resident 116 is associated with a mobile device 115. The mobile devices 113, 115 can each be, for example, a smart phone or tablet computer. The mobile devices 113, 115 each includes a communication module for communicating over one or more wireless networks. For example, the mobile devices 113, 115 can each connect to the internet using a cellular or Wi-Fi network. The mobile devices 113, 115 can each communicate wirelessly with, for example, a GPS satellite system, the monitoring server 120, the camera 104, and other computing devices. The mobile devices 113, 115 can communicate with each other, e.g., by text message, email, telephone call, or through a mobile application.

The camera 104 captures a porch image 126. The porch image 126 shows the porch 111 from the perspective of the camera 104. The porch image 126 can include images captured by the camera 104 and generated from any appropriate type of light. For example, the images can be generated from any combination of visible light, IR light, or UV light. The images can be generated from RADAR, LIDAR, and/or microwave imaging. The porch image 126 can include any combination of still images, recorded video, or live-streamed video. The porch image 126 includes a depiction of the delivery person 114 carrying the package 110.

In some examples, the monitoring server 120 can obtain image analysis data from the camera 104. For example, the camera 104 or a computing system in electrical communication with the camera 104 can perform video analysis on images captured by the camera 104 and transmit video analysis results to the monitoring server 120. The camera 104 can perform video analysis including, e.g., human detection, recognition, and tracking, object detection, recognition, and tracking, background change detection, event detection, etc. The camera 104 can send the results of the video analysis to the monitoring server 120. For example, when a person delivers a package, the camera 104 can perform video analysis to track the person to the front door, detect the package placed on the ground within the camera field of view, and estimate an outline of the package based on a region of pixels that have changed compared to the background. In some examples, the camera 104 can send the porch image 126 to the monitoring server 120 in response to a detected event, e.g., a detection of the package 110 or of the delivery person 114 using video analysis.

The camera 104 can perform video analysis including, e.g., human detection, recognition, and tracking, object detection, recognition, and tracking, background change detection, event detection, etc. In the example of FIG. 1, the camera 104 determines, based on analyzing the porch image 126, that the delivery person 114 carries the package 110 along the path 112. The path 112 leads outside of the field of view of the camera 104. In some examples, the camera 104 may determine that the porch image 126 depicts the delivery person 114 approaching the property 102 with the package 110 and departing from the property 102 without the package 110.

The camera 104 includes a scene model database 142 that stores a spatial model of one or more scenes where packages may be delivered at the property 102. For example, the scene model database 142 can store a model of a scene or scenes including the porch 111. In some examples, the scene model generator or another component of the monitoring system can build the scene model 144 using images captured by multiple installed cameras with overlapping field of view, e.g., the camera 104 and any other cameras at the property that have a field of view that includes the porch 111.

In some examples, the delivery detector 146 can select a version of the scene model 144 using environmental conditions at the property 102. For example, the scene model database 142 can store scene models that represent the scene at various times of day, seasons of year, precipitation conditions, etc. The package locator 130 can select a particular version of the scene model 144 that most closely matches the current date, time, weather conditions, or a combination of these. In some examples, the scene model database 142 can store scene models for multiple properties, and the package locator 130 can select the scene model 144 for the particular property 102.

The delivery detector 146 can determine that a delivery has occurred using the porch image 126, using historical delivery data 162, using external data, or any combination of these. The external data can include delivery schedule data 165 indicating a delivery schedule for the property 102. The delivery schedule data 165 can include schedule data for one or more expected deliveries at the property. In some examples, the delivery schedule data 165 can be provided to the monitoring server 120 from a device associated with the resident 116. For example, the mobile device 115 may receive, from a delivery service, a text message or email indicating an expected delivery time for the first delivery. In some examples, the mobile device 115 can be configured to forward the text message or email to the camera 104. In some examples, the camera 104 can be configured to intercept the text message or email that is sent to the mobile device 115.

In response to detecting a delivery at the property 102, the delivery detector 146 can output indication of the delivery detection 148 to the package locator 130, to the package modeler 134, or both. In some examples, the delivery detector 146 can generate a delivery notification 160 for output to the mobile device 115 indicating that the package 110 was delivered to the property 102. The mobile device 115 receives the delivery notification 160. The delivery notification can include, for example, an electronic mail communication, a text message, a push notification, etc. The delivery notification can include information related to the delivery. The delivery notification can include an image of the delivered package 110, e.g., porch image 126.

The delivery notification can include information related to the delivery. For example, the delivery notification can include information indicating a sender of the package 110, an addressee of the package 110, contents of the package 110, etc. The delivery notification can include information indicating the time of delivery of the package 110, a dropoff location 132 where the package 110 was delivered, information indicating that the package 110 was handed to a resident, etc.

The delivery notification can include a tracking number of the package 110, information related to contents of the package 110, a name of the delivery service, a name of the delivery person 114, a mobile phone number associated with the mobile device 113, a time of delivery, and a dropoff location 132 of delivery. In some examples, the delivery notification can include information related to a size of the package, a shape of the package, a weight of the package, a value of the package, a fragility of the package, and a type of packaging.

In some examples, the delivery notification can include Exchangeable Image File Format (EXIF) data. EXIF is a standard that defines information related to an image or other media captured by a digital camera. It is capable of storing data such as camera exposure, lens intrinsics, a timestamp indicating a date and time the image was captured, and a GPS location where the image was captured. In some examples, the EXIF data can be encoded into the delivery image 128.

In some examples, in addition to or instead of the monitoring server 120 sending the delivery notification 160 to the mobile device 115, the mobile device 113 can send a delivery notification to the mobile device 115. The delivery notification can include an image captured by the mobile device 113, e.g., delivery image 128. The mobile device 113 includes at least one camera. To generate the delivery image 128, the delivery person 114 can operate the mobile device 113 to capture an image of the package 110 at the dropoff location 132 where the package was delivered. For example, the delivery image 128 depicts the package 110 next to the porch 111 of the property 102 from the perspective of the mobile device 113.

The delivery person 114 can operate the mobile device 113 to transmit the delivery notification, including the delivery image 128, to the mobile device 115, the monitoring server 120, or both. In some examples, the mobile device 115 forwards the delivery image 128 to the monitoring server 120 after receiving the delivery image 128. In some examples, the mobile device 113 can transmit the delivery image 128 to a proxy address that forwards the notification to the monitoring server 120, the mobile device 115, or both. In some examples, the monitoring server 120 can intercept the delivery image 128 that is transmitted to the mobile device 115. In some examples, the resident 116 can opt-in through a mobile application to permissions that enable the monitoring server 120 to read delivery notifications and images transmitted to the mobile device 115.

In response to the delivery detection 148, the package locator 130 determines a dropoff location 132 to which the package 110 was delivered. The package locator 130 can determine the dropoff location 132 using the porch image 126, the scene model 144, historical delivery data 162, or any combination of these. When the delivery person 114 approaches the property 102, the package locator 130 can track movement of the delivery person 114 and determine a path traveled by the delivery person 114. In some examples, the package locator 130 can determine, using video images captured by the camera 104, that the delivery person 114 approached the property with a package, placed a package down within the field of view of the camera 104, and departed from the property. The package locator 130 can thus determine the dropoff location 132 using the video images captured by the camera 104.

In some examples, the package locator 130 can track the path traveled by the delivery person 114 and can determine a dropoff location of the package 110, even when the dropoff location is outside of the field of view of the camera 104. For example, in FIG. 1, the delivery person 114 carries the package 110 along path 112 to a dropoff location 132 that is outside of the field of view of the camera 104. The package locator 130 can determine, using the scene model 144, that the path 112 leads towards the location 118. The package locator 130 can therefore determine that the delivery person 114 has delivered the package 110 to the location 118.

In some examples, the package locator 130 can determine that the package 110 has been delivered to a particular dropoff location 132 using the historical delivery data 162. In some examples, the historical delivery data 162 can store a data entry for past deliveries, with each entry including a time of the delivery and a dropoff location 132 of the delivery. The historical delivery data 162 can be generated from images captured by the camera 104 and other sensors at the property. In some examples, the monitoring server 120 can assess a condition of delivered packages at various times. For example, the monitoring server 120 can analyze images of a delivered package to perform visual inspection and determine conditions of the package upon delivery, prior to moving the package, after moving the package, upon retrieval by a resident, or any of these.

The monitoring server 120 can store data indicating the conditions of the packages as historical delivery data 162. The historical delivery data 162 can be used to train one or more machine learning models used by the drone management subsystem 140. For example, the drone management subsystem 140 can learn which actions result in damage to packages, and which actions result in packages being retrieved by residents in good condition.

The historical delivery data 162 can include data indicating historical package delivery locations. The historical package delivery locations can be determined, for example, using historical camera image data, using user feedback, using historical delivery schedule data, or any combination of these. For example, the package locator 130 can determine, using the historical delivery data 162, that packages are frequently delivered to location 118, near the porch 111.

The package locator 130 can determine, using the historical delivery data 162, that the location 118 is a common package delivery location. The package locator 130 can then estimate, using the porch image 126 and using the historical delivery data 162, that the dropoff location 132 is the location 118.

In response to the delivery detector 146 detecting a delivery detection 148, the package modeler 134 can generate a package model 136. The package modeler 134 can generate the package model 136 using the scene model 144, the porch image 126, the delivery image 128, or any combination of these. The monitoring server 120 determines a risk score 138 for the package 110 at the dropoff location 132 using the package model 136. The risk score 138 represents a likelihood of theft, damage, or both, of the package 110. The drone management subsystem 140 uses the risk score 138 to determine whether to perform any actions to reduce the risk. In some examples, the drone management subsystem can determine to perform one or more actions to reduce the risk. The drone management subsystem 140 can output drone commands 150 to cause the drone 106 to perform the one or more actions. Operations of the package modeler 134, the risk assessment engine 122, the drone management subsystem 140, and the drone 106 are described in greater detail with reference to FIG. 2.

Though described above as being performed by a particular component of the monitoring system (e.g., the camera 104 or the monitoring server 120), any of the various control, processing, and analysis operations can be performed by either the camera 104, the monitoring server 120, or another computer system of the monitoring system. For example, the monitoring system monitoring the property 102 may include a control unit. The control unit may be configured to monitor and control various sensors and devices at the property 102. The control unit may communicate with the camera 104 and other sensors over a wireless network at the property 102. The control unit, the monitoring server 120, the camera 104, or another computer system can analyze images to detect package deliveries, determine package locations, and/or analyze risk of packages at the property 102.

Figure 2:
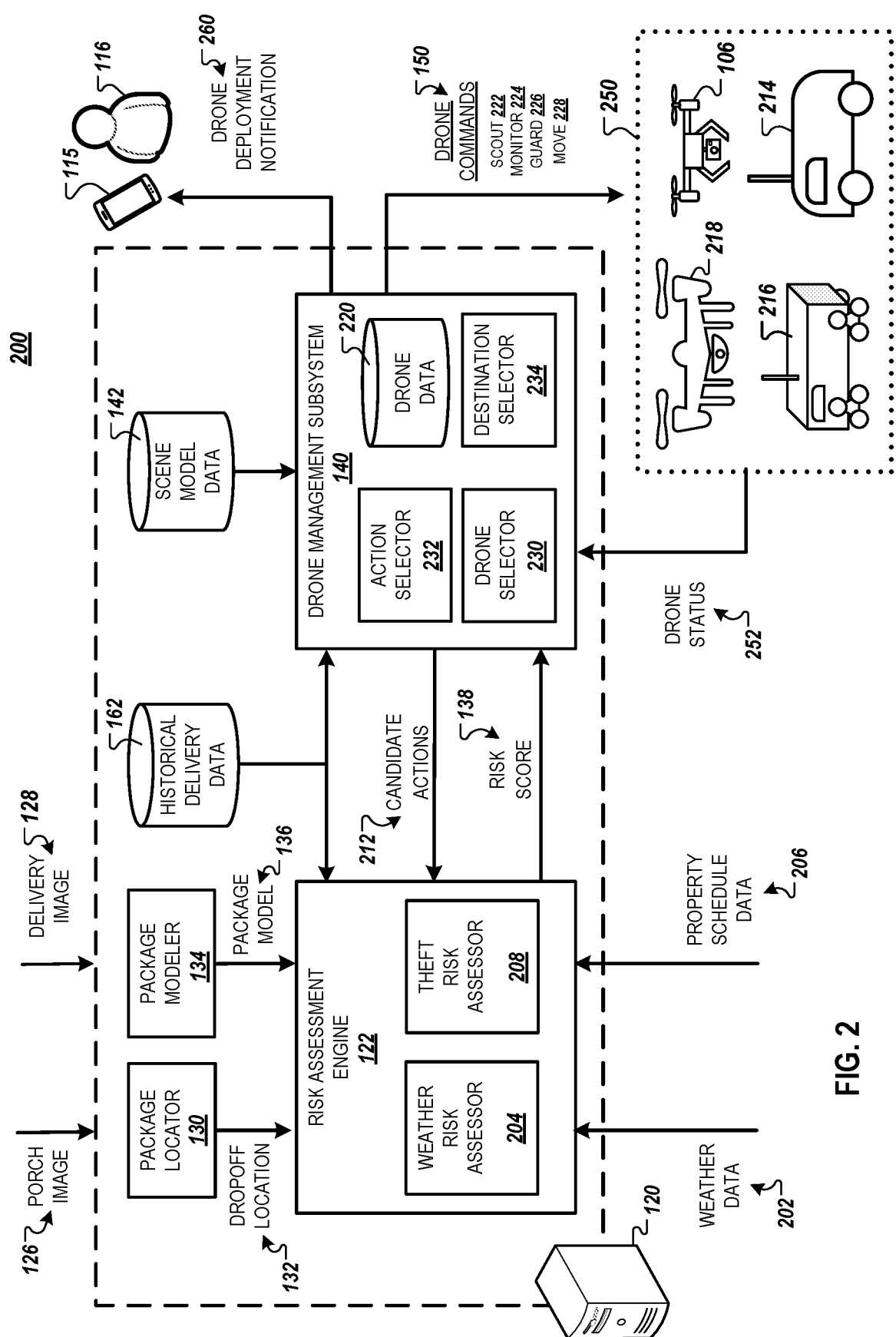
FIG. 2 is a diagram of an example system for fetching and guarding packages using drones.

FIG. 2 illustrates an example system 200 for fetching and guarding packages. The system includes the monitoring server 120 and a set of drones 250. The monitoring server 210 includes a drone management subsystem 140. The drone management subsystem 140 includes a database of drone data 220. Components of the monitoring server 210 can be provided as one or more computer executable software modules or hardware modules. That is, some or all of the functions of components of monitoring server 210 can be provided as a block of computer code, which upon execution by a processor, causes the processor to perform functions described below. Some or all of the functions of components of the monitoring server 210 can be implemented in electronic circuitry, e.g., by individual computer systems (e.g., servers), processors, microcontrollers, a field programmable gate array (FPGA), or an application specific integrated circuit (ASIC).

In some examples, the monitoring server 120 is configured to communicate with the set of drones 250. The set of drones 250 includes one or more aerial, ground, surface water, or underwater drones. As depicted in FIG. 2, the set of drones 250 includes large aerial drone 218, small aerial drone 106, stairclimber ground robot 216, and rolling ground robot 214. The set of drones 250 can be a component of the property monitoring system. Each drone of the set of drones 250 can maneuver around the property 102, collect sensor data from various areas of the property 102, and perform various actions as commanded by the monitoring server 120, the camera 104, a control unit, or another device.

As described above with reference to FIG. 1, in response to delivery detection 148 at the property 102, the package modeler 134 can generate a package model 136 using the scene model 144, the porch image 126, the delivery image 128, or any combination of these. Size and weight estimates can be determined using the delivery schedule data 165. The camera 104 or a camera of a drone, can read the shipping label of the package 110, and the package modeler 134 can use the information of the shipping label to determine the size and weight of the package.

The package model 136 can include an estimated size and weight determined based on observations of the delivery person 114 carrying the package 110. For example, the size of the package 110 can be estimated by comparing the size of the package to the delivery person 114, assuming an average height of the delivery person 114, by comparing the package size against nearby landmarks, or both. Weight can be estimated based on whether the delivery-person is using a hand-cart or other equipment, and/or based on apparent effort on the part of the delivery-person determined using image analysis.

Images of the package 110 from multiple views can be stored as part of a visual model of the package 110, e.g., package model 136. The package modeler 134 can generate the package model 136 including pixel boundaries of the package 110. The package modeler 134 can build a rough three-dimensional model of the package 110. The package model 136 can be a three-dimensional reconstruction of the package 110. The package model 136 can include features of the package 110, e.g., a size, shape, material, and color of the package 110. The package model 136 can include characteristics of the package 110 such as a size, shape, weight, tracking number, bar code, appearance, value, fragility, or any combination of these characteristics. In some examples, the package model 136 can include a model of markings on the package, e.g., a logo or label on the package 110. In some examples, the package model 136 can include a model of the appearance of each side of the package that is visible in at least one image.

The risk assessment engine 122 can assess the risk to the package 110 using the package model 136 and the dropoff location 132. The risk assessment engine 122 includes a weather risk assessor 204 and a theft risk assessor 208. The risk assessment engine 122 can receive, as input, weather data 202 and property schedule data 206. The risk assessment engine 122 outputs the risk score 138. The risk score 138 can be determined based on an assessment of multiple types of risks, e.g., weather risk and theft risk. The risk score 138 represents a likelihood that the package 110 will be damaged, stolen, or both.

The risk assessment engine 122 can assess various risks to the package. For example, the risk assessment engine 122 can assess the risk of wildlife interference with the package. Wildlife interference can include, for example, theft of the package by wildlife, consumption of the package by wildlife, infestation of the package by wildlife, or any combination of these. The risk assessment engine 122 can assess the risk of wildlife interference using, e.g., geographic data indicating populations of wildlife in the geographic area of the property 102.

In some examples, the risk assessment engine 122 assesses the risk to the package 110 at the dropoff location 132. The dropoff location 132 can include an indication of dropoff positioning. For example, the package 110 may be placed on the porch 111, at or near an edge of the porch 111, such that the package 110 is at risk of falling off of the porch 111. The risk assessment engine 122 can determine a higher risk of damage to the package 110 based on the package 110 being at risk of falling off the porch 111, compared to the risk of damage to the package 110 if the dropoff position was further from the edge of the porch 111.

In some examples, the risk assessment engine 122 assesses the risk to the package 110 at candidate destinations. For example, the drone management subsystem 140 can identify one or more candidate actions 212 that can include candidate destinations to which to move the package 110, and the risk assessment engine 122 can determine the risk at the candidate destinations. In some examples, the risk assessment engine 122 can determine a difference between the risk to the package 110 at the dropoff location 132 and the risk to the package 110 at the candidate destinations.

In some examples, the property schedule data 206 includes a schedule for departure of the resident 116 from the property, a schedule for arrival of the resident 116 at the property, or both. The theft risk assessor 208 can assess the risk of theft of the package 110 and the weather risk to the package 110 based at least in part on an amount of time that the package 110 is expected to be left unattended before being retrieved by the resident 116.

In some examples, the risk assessment engine 122 can assess the risk to the package using historical delivery data 162. For example, the historical delivery data 162 can indicate locations to which packages have been delivered in the past, and outcomes for the packages. For example, the historical delivery data 162 can include data entries for packages that have been delivered to the dropoff location 132. For each data entry, the historical delivery data 162 can indicate a length of time that the package was at the dropoff location 132 before being retrieved by a resident of the property 102. For each data entry, the historical delivery data 162 can indicate characteristics of the package.

The historical delivery data 162 can indicate whether packages at the dropoff location 132 were damaged, and, if the packages were damaged, a type of damage and an extent of damage. The historical delivery data 162 can indicate whether packages at the package location were stolen, and, if the packages were stolen, a time at which the theft occurred.

The historical delivery data 162 can include data indicating movement of packages that have been delivered to the property 102. For example, the historical delivery data 162 can include data entries for packages that have been moved by drones after being delivered to the property 102. For each data entry, the historical delivery data 162 can indicate a type of drone that moved the package, a starting location and a destination for the package, weather conditions during movement, a path of the movement, characteristics of the package, or any of these.

The weather risk assessor 204 can assess the weather risk to the package 110. The weather risk can include risk of damage to the package 110 due to environmental effects, e.g., heat, rain, snow, or any combination of these. Environmental effects can include high temperatures, low temperatures, direct sunlight, high humidity, and wind speed. In some examples, the weather risk assessor's assessment of the weather risk to the package 110 is based at least in part on the package model 136. The package model 136 can include features of package contents, e.g., a perishability of package contents, a value of the contents, a designated temperature range for the contents, a weight of the contents, or any of these.

The weather risk assessor 204 can determine the weather risk to the package 110 using the features included in the package model 136. For example, a first package can contain a pair of shoes, and the package model 136 for the first package can include a lower degree of perishability. A second package can contain a bag of groceries, and the package model 136 for the second package can include a higher degree of perishability. On a hot day, the weather risk assessor 204 can determine a lower weather risk for the first package having the lower degree of perishability, and a higher weather risk at the same high temperatures for the second package having the higher degree of perishability.

The weather risk assessor 204 can determine the weather risk using weather data 202. The weather data 202 can include, for example, data indicating current weather conditions and weather forecast data.

The theft risk assessor 208 can assess the theft risk to the package 110. The theft risk can include risk of theft to the package 110 by a person. The theft risk assessor 208 can determine the theft risk based on various factors. The factors used to evaluate theft risk can include, for example, a frequency of passersby as detected by the camera 104. The factors used to evaluate theft risk can include the visibility of the dropoff location 132, e.g., from the property 102, from the street or both. In some examples, the theft risk assessor 208 can evaluate theft risk using the historical delivery data 162. The historical delivery data 162 can include data indicating dropoff locations from which packages have been stolen in the past.

The factors used to evaluate theft risk can include schedule factors from the property schedule data 206. For example, the schedule factors can include a schedule for snow plowing at the property, a schedule for lawn mowing at the property, a schedule for dog walking at the property, a schedule for a cleaning service at the property, a schedule for a maintenance service at the property, or any combination of these.

In some examples, the risk assessment engine 122 can determine the risk score 138 using rules. In some examples, the risk assessment engine 122 can use one or more machine learning models. The risk assessment engine 122 can learn the risk to packages due to various factors. In some examples, the risk assessment engine 122 can be trained using data from multiple properties. For example, the risk assessment engine 122 can learn the type and extent of damage to packages caused by different risk factors. In some examples, the risk assessment engine 122 can be globally trained using data from multiple properties, and can be locally trained using data from the property 102.

The risk assessment engine 122 outputs the risk score 138 to the drone management subsystem 140. The risk score 138 can include a weather risk score, a theft risk score, or both. In some examples, when the risk assessment engine 122 outputs a single risk score 138, the risk assessment engine 122 can determine the single risk score 138 using a combination, e.g., a sum, of a weather risk score and a theft risk score.

The drone management subsystem 140 manages operations of a set of drones 250. The drone management subsystem 140 includes a database of drone data 220. The drone management subsystem 140 includes an action selector 232, a drone selector 230, and a destination selector 234. When packages are delivered to the property 102, the drone management subsystem 140 can use the risk score 138 to determine whether to deploy a drone to perform an action for the package.

The drone management subsystem 140 includes the action selector 232. The action selector 232 determines whether to perform an action for the package, and selects an action to perform for the package. In some examples, the action selector 232 can use a set of rules to determine actions. In some examples, the rules can specify various actions to perform for various risk scores and package characteristics.

In some examples, the action selector 232 can determine multiple candidate actions 212 for the package 110. The action selector 232 can output the multiple candidate actions 212 to the risk assessment engine 122. The risk assessment engine 122 can determine risk scores for each of the candidate actions 212. In some examples, the action selector 232 can select an action to perform for the package 110 by selecting one of the candidate actions 212 using the respective risk scores for the candidate actions 212. For example, the action selector 232 can select a candidate action 212 having a lowest likely risk represented by a corresponding risk score, e.g., the lowest risk score or the highest risk score depending on how the monitoring system is configured.

In some examples, the action selector 232 determines to skip performing an action for the package 110. For example, the action selector 232 can compare the risk score 138 to a threshold risk score. In response to determining that the risk score 138 does not satisfy, e.g., is less than, or less than or equal to, the threshold risk score, the action selector 232 can determine to skip performing an action for the package.

In some examples, the candidate actions 212 can include one or more candidate destinations to which to move the package 110. In some examples, the action selector 232 can compare the risk score 138 to a risk score of one or more candidate destinations specified by the candidate actions 212. In response to determining that the risk score 138 does not satisfy, e.g., is less than or equal to, the risk scores of the candidate destinations, the action selector 232 can determine to skip performing any action for the package. For example, the risk score 138 can include a score of thirty percent risk of damage at the dropoff location 132. The risk score for a first candidate destination can be forty percent risk of damage, and the risk score for a second candidate destination can be fifty percent risk of damage. In response to determining that the risk score 138 of thirty percent risk is less than the risk scores at the first candidate destination and at the second candidate destination, the action selector 232 can determine not to perform an action for the package 110.

In some examples, the action selector 232 can determine that a difference between the risk score 138 and the risk scores of candidate destinations does not satisfy, e.g., is less than or equal to, a threshold difference. In response to determining that the difference between the risk score 138 and the risk scores of the candidate destinations does not satisfy the threshold difference, the action selector 232 can determine to skip performing any action for the package. For example, the risk score 138 can include a score of thirty percent risk of damage to the package at the dropoff location 132. The risk score at a first candidate destination can be twenty-five percent risk of damage, and the threshold difference can be ten percent. In response to determining that the difference of five percent between the risk score 138 of thirty percent and the risk score of the first candidate destination of twenty-five percent is less than the threshold difference of ten percent and therefore does not satisfy the threshold difference, the action selector 232 can determine not to perform any action for the package 110.

In some examples, the action selector 232 can determine to deploy a drone to scout 222 the package 110. For example, the package 110 can be delivered to a blind spot of the camera 104. The dropoff location 132 determined by the package locator 130 may therefore be unknown or imprecise. The action selector 232 can determine to deploy a drone to scout 222 the package in order to determine a more precise package location. Deploying the drone to scout 222 the package can include sending instructions to the drone to cause the drone to scout 222 the package. In general, deploying the drone can include sending instructions to the drone to cause the drone to perform a corresponding action.

In some examples, the package 110 can be delivered to a location within a field of view of the camera 104, or in a blind spot of the camera 104, and the action selector 232 can determine to deploy a drone to scout 222 the package in order to gather information about the package 110. For example, the action selector 232 can determine to deploy a drone to capture images of the package 110 in order to determine characteristics of the package 110, such as the package size, shape, fragility, value, material, or any of these. In some examples, the action selector 232 can determine to deploy a drone to read a label and/or barcode of the package 110.

In some examples, the action selector 232 can determine to deploy a drone to move 228 the package 110. In some examples, the action selector 232 can compare the risk score 138 to a risk score of one or more candidate destinations. In response to determining that the risk score 138 is greater than or equal to the risk score of at least one of the candidate destinations, such that moving the package 110 to the at least one of the candidate destinations would reduce the risk of theft and/or damage to the package, the action selector 232 can determine to move 228 the package 110. For example, the risk score 138 can include a score of thirty percent risk of damage at the dropoff location 132. The risk score for a first candidate destination can be twenty percent risk of damage, and the risk score for a second candidate destination can be forty percent risk of damage. In response to determining that the risk score 138 of thirty percent risk is greater than the risk scores at the first candidate destination, the action selector 232 can determine to move 228 the package 110 to the first candidate destination. In some examples, the action selector 232 can determine to move 228 the package 110 to the candidate destination at which the package has the lowest likelihood of theft and/or damage, e.g., the candidate destination with the lowest risk score.

In some examples, the action selector 232 can determine that a difference between the risk score 138 and the risk scores of candidate destinations satisfies, e.g., is greater than or equal to, a threshold difference. In response to determining that the difference between the risk score 138 and the risk scores of the candidate destinations is greater than or equal to the threshold difference, and therefore satisfies the threshold difference, the action selector 232 can determine to move 228 the package 110. For example, the risk score 138 can include a score of thirty percent risk of damage to the package at the dropoff location 132. The risk score at a first candidate destination can be twelve percent risk of damage, and the threshold difference can be ten percent. In response to determining that the difference of eighteen percent between the risk score 138 of thirty percent and the risk score of the first candidate destination of twelve percent is greater than the threshold difference of ten percent, and therefore satisfies the threshold difference, the action selector 232 can determine to move 228 the package 110 to the first candidate destination.

In some examples, the action selector 232 can determine to monitor 224 the package 110 at the dropoff location 132. Monitoring the package 110 can include deploying a drone

250 to a location where the package 110 is within a field of view of a sensor of the drone. Sensor data, e.g., camera images, generated by the sensor of the drone, can be provided to the drone management subsystem 140 as part of a drone status data 252 sent to the drone management subsystem 140.

In some examples, the action selector 232 can compare the risk score 138 to a range of risk scores for monitoring packages. For example, a rule can specify that for risk scores at or below twenty percent, the action selector 232 selects no action, for risk scores above twenty percent and at or below forty percent, the action selector 232 selects to monitor the package, and for risk scores above forty percent, the action selector 232 selects to move the package. The action selector 232 can determine that the risk score 138 is thirty percent. In response to determining that the risk score 138 of thirty percent is above twenty percent and at or below forty percent, the action selector 232 can select to monitor 224 the package 110.

In some examples, the action selector 232 can determine to monitor 224 the package 110 instead of moving the package 110 based on characteristics of the package 110 indicated by the package model 136. For example, the package model 136 can indicate that the package 110 is fragile, large, heavy, valuable, or any combination of these. The action selector 232 can determine to monitor 224 the package 110 based on the fragility, size, weight, and/or value of the package.

In some examples, the action selector 232 can compare characteristics of the package 110 to capabilities of the drones 250 to determine whether to monitor 224 or to move 228 the package 110. For example, the action selector 232 can access the drone data 220 to determine capabilities of the drones 250. In some examples, the drone data 220 includes data indicating limitations of the set of drones 250. For example, the drone data 220 can include data indicating a maximum size, a minimum size, or both, of packages that are capable of being moved by any of the drones 250. The drone data 220 can include data indicating a maximum weight, a minimum weight, or both, of packages that are capable of being moved by any of the drones 250, or both. In response to determining, using the package model 136, that the package 110 size and/or weight is outside of limits for movement by the drones 250, the action selector 232 can determine to monitor 224 the package 110 instead of moving 228 the package 110.

In some examples, the action selector 232 can compare characteristics of the package 110 to user preferences to determine whether to monitor 224 or move 228 the package 110. For example, the drone management subsystem 140 can store preference data input by a user, e.g., resident 116, for actions to take for various packages. The preference data can indicate, for example, a maximum value, a minimum value, or both, of packages that are to be moved. The preference data can indicate, for example, a maximum fragility, a minimum fragility, or both, of packages that are to be moved. In response to determining, using the package model 136, that the package 110 fragility and/or value is outside of limits for movement, the action selector 232 can determine to monitor 224 the package 110 instead of moving 228 the package 110.

In some examples the action selector 232 can determine to guard 226 the package 110 at the dropoff location 132. Guarding the package 110 can include deploying a drone 250 to the dropoff location 132 to protect the package 110. For example, a drone 250 can include one or more protective structures, e.g., shields, containers, coolers, umbrellas, visors, platforms, weatherproof enclosures, or any of these. The action selector 232 can determine to assign one of the drones 250 to the dropoff location 132 and to use protective structures of the drone to protect the package 110 from the environment and/or from interference from passersby.

In some examples, the action selector 232 can determine to guard 226 the package 110 when the risk score 138 satisfies, e.g., is at or above a threshold risk score, and when the action selector 232 determines not to move 228 to the package 110. For example, the threshold risk score can be forty percent risk, and the risk score 138 can be fifty percent. The maximum weight for movement by any of the drones 250 can be thirty pounds, and the weight of the package 110 indicated by the package model 136 can be thirty-five pounds. In response to determining that the risk score 138 of fifty percent is above the threshold risk score of forty percent and therefore satisfies the threshold risk score, and that the weight of thirty-five pounds is greater than the maximum weight of thirty pounds, the action selector 232 can determine to deploy a drone to guard 226 the package 110 at the dropoff location 132.

In some examples, the action selector 232 can prioritize characteristics of the package in order to determine whether to perform an action, and to select an action to perform. For example, the package model 136 can indicate that the package 110 includes groceries including a dozen eggs, and therefore has a high level of perishability and a high level of fragility. The weather data 202 can include that the temperature at the property 102 is above eighty degrees Fahrenheit. The risk assessment engine 122 can determine a high risk score, e.g., of seventy-five percent, due to a high weather risk. The action selector 232 can compare the risk score 138 of seventy-five percent to a threshold risk score, e.g., of forty percent. In response to determining that the risk score 138 of seventy-five percent is greater than the threshold risk score of forty percent, and therefore satisfies the threshold risk score, the action selector 232 can determine to perform an action for the package 110. The action selector 232 can generate multiple candidate actions 212, including moving 228 the package 110, monitoring 224 the package 110, and guarding 226 the package 110 with a drone, e.g., ground robot 216, that includes an integrated cooler. The risk assessment engine 122 can determine a risk score 138 for each of the candidate actions. The candidate action 212 of moving 228 the package 110 can have a risk score of sixty percent, the candidate action 212 of monitoring 224 the package 110 can have a risk score of seventy percent, and the candidate action 212 of guarding 226 the package 110 with the ground robot 216 with the integrated cooler can have a risk score of forty percent. Using the risk scores for the candidate actions 212, the action selector 232 can determine to assign the ground robot 216 that has an integrated cooler to guard 226 the package 110.

In some examples, the action selector 232 can determine multiple actions to be performed simultaneously or in sequence. For example, in response to determining that the package 110 has been delivered to a blindspot of the camera 104, the action selector 232 can determine to assign one of the drones 250 to scout 222 the package 110. Once the package 110 has been scouted, the action selector 232 can determine whether to perform any additional actions. The action selector 232 may determine to move the package 110 from the scouted location to a different location. The action selector 232 can then determine to assign one of the drones 250 to move 228 the package 110 to the different location.

In some examples, the action selector 232 can determine to monitor 224 the package 110, and based on monitoring 224 the package 110, can determine to perform additional actions. For example, the action selector 232 can determine to assign one of the drones 250 to monitor 224 the package 110 at the dropoff location 132. The drone 250 can provide a drone status 252 to the drone management subsystem 140 while monitoring the package 110. The drone status data 252 can indicate a location of the ground robot 216, environmental conditions at the location of the ground robot 216, sensor data generated by sensors of the ground robot 216, or any combination of these. The action selector 232 can determine, using the drone status data 252, that rain has started falling at the location of the ground robot 216, and that the package 110 is exposed to the rain. In response, the action selector 232 can determine to perform one or more actions to protect the package 110 from the rain. For example, the action selector 232 can determine to assign the same drone, or a different drone, to guard 226 or move 228 the package 110.

The drone management subsystem 140 includes the destination selector 234. When the action selector 232 determines to move 228 the package 110, the destination selector 234 selects a destination to which to move the package 110. In some examples, the destination selector 234 determines a path for a drone to travel between the dropoff location 132 and the destination.

The drone management subsystem 140 includes the drone selector 230. When the action selector 232 determines to perform an action for the package 110, the drone selector 230 selects a drone to perform the action. In some examples, the destination selector 234 selects a destination, and the drone selector 230 selects a drone based at least in part on the selected destination. In some examples, the drone selector 230 selects a drone, and the destination selector 234 selects a destination based at least in part on capabilities of the selected drone.

In some examples, the destination selector 234 stores data representing candidate destinations. Candidate destinations can be locations at and around the property 102 to which drones can move packages. In some examples, the destination selector 234 stores data representing a ranked list of candidate destinations. The candidate destinations can be ranked based on factors such as user preferences, risk scores for packages located at the destinations, historical delivery data 162 indicating conditions of packages located at the destinations, accessibility of the destinations to people, accessibility of the destinations to drones, sensor coverage of the destinations, or any combination of these.

For example, a higher priority candidate destination can be within the field of view of the camera 104, protected from weather elements, not visible to passersby, accessible by ground robots, accessible by aerial drones, or any combination of these. A lower priority candidate destination can be outside of the field of view of the camera 104, exposed to weather elements, visible to passersby, difficult to access by drone, or any combination of these.

In some examples, the candidate destinations can be determined using the scene model data 142. For example, the destination selector 234 can determine, using the scene model data 142, that a location next to the porch 111 is covered by an overhang and hidden from view by passersby. The destination selector 234 can store the location next to the porch 111 as a candidate destination for packages delivered to the property.

In some examples, the candidate destinations can be determined based on preferences input by a user. For example, the user preferences can indicate that the resident's highest priority destination is the porch 111, and that the second highest priority destination is at the back door of the particular property 102. The destination selector 234 can store data indicating that the porch 111 and the back door of the particular property 102 are candidate destinations, with the porch 111 having a higher priority than the back door.

In some examples, the scene model data 142 can include labeled areas of the property. For example, user input can be received, indicating areas of the property that are preferred for delivering packages, and areas that are not preferred for delivering packages. The user input indicating the preferred and not preferred areas can be used to label the corresponding areas of the scene models stored in the scene model data 142.

The destination selector 234 can select a destination for the package 110 based on the priority of the candidate destinations, the size of the package 110, the capabilities of available drones, a distance between the dropoff location 132 and the destination, obstacles between the dropoff location 132 and the destination, or any combination of these.

In some examples, the destination selector 234 can select, as a destination, the candidate destination having the highest priority that is accessible by an available drone. For example, the porch 111 can be assigned as the highest priority candidate destination, based on the scene model 144 from the scene model database 142, based on user preferences, or both.

The destination selector 234 can select the porch 111 as the destination based on determining that the package 110 will fit on the porch 111, and based on determining that at least one of the drones 250 is capable of moving the package 110 from the dropoff location 132 to the porch 111.

In some examples, the destination selector 234 can determine that the highest priority destination is unavailable, and can select a lower priority destination instead. For example, the destination selector 234 can determine that the package 110 will not fit on the 111 or that no available drones 250 are capable of moving the package 110 from the dropoff location 132 to the porch 111. Therefore, the destination selector 234 can select a different destination, e.g., the back door of the property 102.

In some examples, multiple packages can be delivered to the property 102, and the destination selector 234 can select destinations for each of the multiple packages. For example, the multiple packages can include a first package that has a higher value than a second package. The destination selector 234 can determine that both packages cannot fit on the porch 111. In response to determining that both packages cannot fit on the porch 111, the destination selector 234 can prioritize the first, higher value, package, and determine to move the first package to the porch 111, which is within the field of view of the camera 104. The destination selector 234 can determine to move the second, lower value, package to an area next to the porch 111, which is not within the field of view of the camera 104.

In some examples, a first package can be made from a material that is more susceptible to damage from weather elements, and a second package can be made from a material that is less susceptible to damage from weather elements. For example, the first package can be made from cardboard, and the second package can be made from plastic. A particular destination may be protected from weather elements, but too small to fit both packages. The destination selector 234 can prioritize the first package, based on the first package being more susceptible to damage from weather elements compared to the second package. The destination selector 234 can determine to move the first package to the destination that is protected from the weather elements. The destination selector 234 can determine to leave the second package in place, or to move the second package to a destination that is exposed to weather elements.

In some examples, a first package can have a color that is more susceptible to damage from weather elements, and a second package can have a color that is less susceptible to damage from weather elements. For example, the first package can have a darker color, and the second package can have a lighter color. The destination selector 234 can prioritize the first package, based on the first package being more susceptible to heat damage compared to the second package.

The drone management subsystem 140 accesses the database of drone data 220 to determine capabilities of the set of drones 250. The drone management subsystem 140 assigns drones to assist with package deliveries using the capabilities and availabilities of each drone.

The drones of the set of drones 250 can each be an automated device that is capable of movement. A drone can have one or more movement capabilities. For example, a drone may be able to move by flying, rolling, walking, climbing stairs, hopping, or any combination of these. A drone may be a wheeled vehicle, a vehicle with treads, or a bipedal device. A drone can navigate to, from, and around the property 102 using automated control technology and/or user input control provided by a user. A drone can have one or more movement capabilities. For example, a drone may be able to move by flying, rolling, walking, climbing stairs, hopping, etc.

In some examples, drones of the set of drones 250 can include data capture and recording devices, sensors, or both. In some examples, the drone 106 may include a communication module. The communication module can enable the drone 106 to communicate with, for example, a GPS satellite system, the monitoring server 120, the camera 104, other robots, and other devices, e.g., the mobile device 115. The communication module can be a wireless communication module that allows the drone 106 to communicate wirelessly. In some examples, the set of drones 250 is associated with the property 102. In some examples, the set of drones 250 is associated with a community or neighborhood. For example, a community association may own a set of drones that can be used to assist with package pickups and deliveries at properties within the community.

A drone can include sensors and control processors that guide movement of a drone. The control processors can process output from the various sensors and control a drone to move toward a desired destination and avoid obstacles. A drone may be guided to a destination using for example, GPS navigation. The GPS navigation may direct a drone to move to a latitude and longitude that corresponds to a destination location.

The drone data 220 includes data indicating characteristics and capabilities of the set of drones 250. The drone data 220 can indicate whether a particular drone is capable of flight, rolling, walking, climbing, hopping, slithering, or any combination of these. The drone data 220 may indicate whether a particular wheeled drone is capable of rolling uphill and downhill, over terrains that include grass, pavement, or gravel. The drone data 220 can include a size of wheels, a type of tread of the wheels, a size of a drone, an orientation of a drone, or any combination of these. The drone data 220 can include data indicating limitations of the set of drones 250. For example, the drone data 220 can include data indicating maximum and minimum velocities and altitudes of the set of drones 250. The drone data 220 can include data indicating environmental limitations of the drones, e.g., maximum wind speed in which an aerial drone is capable of operating. The drone data 220 can include features of the drones, e.g., heat resistance, wind resistance, water resistance, cooling ability, heating ability, or any combination of these.

A drone may be able to transport packages of particular sizes, shapes, and weights. In some examples, the drone data 220 includes package carrying capabilities of the set of drones 250. For a particular drone, the drone capabilities can include a number of packages that the drone is able to carry, a maximum weight of packages, a maximum size of packages, a maximum distance of package transport, or any combination of these.

The drone selector 230 selects one or more drones 250 to perform the actions determined by the action selector 232, which may include moving the package 110 to the destination selected by the destination selector 234.

In some examples, the destination selector 234 outputs a selected destination to the drone selector 230. The drone selector 230 can determine whether any drones 250 are available to move the package 110 to the selected destination. The drone selector 230 can then select one of the drones 250 to move the package 110 to the selected destination.

In some examples, the drone selector 230 can determine that no drones 250 are available to move the package 110 to the selected destination. The destination selector 234 can then select a different destination to which to move the package 110. For example, destination selector 234 can select the porch 111 as the destination. The drone selector 230 may determine, using the drone status data 252, that the robots 106, 218, 216 are all unavailable due to maintenance or due to other assignments. The drone selector 230 can determine, using the drone data 220, that the ground robot 214 is not capable of climbing to the porch 111. Therefore, the drone selector 230 can output, to the destination selector 234, an indication that no drones are available to move the package 110 to the porch 111, and that the only available drone is the rolling ground robot 214. The destination selector 234 can then select a different destination that is accessible by the rolling ground robot 214.

In some examples, the drone selector 230 can determine not to deploy any drone. For example, the drone selector 230 may determine that current weather conditions are outside of the acceptable weather conditions for operating any drones of the set of drones 250. In some examples, the drone selector 230 can determine that no drones are available, e.g., due to maintenance or other tasks.

In some examples, the drone selector 230 can determine to assign multiple drones to perform multiple actions. For example, the action selector 232 can determine actions of moving the package and then guarding the package. The drone selector 230 can determine to assign the drone 218 to move 228 the package 110 from the dropoff location to a second location, and then to guard 226 the package 110 at the second location. In some examples, the drone selector 230 can determine to assign the drone 218 to move 228 the package 110 from the dropoff location to a second location, and assign the ground robot 214 to guard 226 the package 110 at the second location.

In some examples, the drone selector 230 can determine to assign multiple drones to perform the same action. For example, the action selector 232 can determine an action of moving the package from the dropoff location to a second location. The drone selector 230 can determine that the weight of the package 110 is at or greater than a maximum threshold weight for the drone 218, and is less than or equal to a combined maximum threshold weight for the drone 218 and the drone 106. Therefore, the drone selector 230 can determine to assign the drone 218 and the drone 106 to move 228 the package 110 together from the dropoff location to a second location.

In some examples, the property 102 may be associated with a single drone, e.g., small aerial drone 106. In some examples, the drone management subsystem 140 determines whether the drone 106 is capable of transporting the package 110 to the destination, e.g., porch 111. For example, the drone management subsystem 140 can determine, using the drone data 220 and the package model 136, whether the drone 106 is capable of lifting the package 110, e.g., given the shape, weight, or both, of the package 110. In response to determining that the drone 106 is capable of transporting the package 110, the drone management subsystem 140 can determine to deploy the drone 106 to the package 110. In response to determining that the drone 106 is not capable of transporting the package 110, the drone management subsystem 140 can determine not to deploy the drone 106 to the package 110.

In some examples, the property 102 may be associated with a set of drones 250, e.g., including small aerial drone 106 and rolling ground robot 214. In some examples, the drone management subsystem 140 can determine whether any drone of the set of drones 250 is capable of transporting the package 110. Based on determining that only a particular drone of the set of drones 250 is capable of transporting the package 110, the drone management subsystem 140 can determine to deploy the particular drone to the package 110.

In response to determining that more than one drone of the set of drones 250 is capable of transporting the package 110, the drone management subsystem 140 can select a particular drone of the set of drones 250 to the package 110. The drone management subsystem 140 can select the particular drone using drone selection criteria. The drone selection criteria can be based in part on a power level of a power source of the drone. For example, the drone management subsystem 140 can select a particular drone based on the particular drone having a higher power level than other drones.

In some examples, the drone selection criteria can be based on a run time of the set of drones 250. For example, the drone management subsystem 140 can select a particular drone based on the particular drone having a lesser total operating time compared to another drone. This can increase the overall life, performance, or both, of at least some of the drones 250. In some examples, the drone management subsystem 140 can rotate through selection of the set of drones 250, such that each drone of the set of drones 250 is operated for approximately equal amounts of time, e.g., during a time period. The time period can be a day, a week, a month, the lifetime of the drone, or another appropriate time period.

The drone data 220 can include an availability of each drone. The drone selection criteria can be based on an availability of the set of drones 250, as indicated by the drone data 220. For example, multiple packages may be designated for movement at the same time or within a same time window. In some examples, a first package and a second package are selected for movement within a particular time window. The drone management subsystem 140 determines that the drone 106 is not capable of transporting the first package, and therefore assigns the ground robot 214 to transport the first package. The drone management subsystem 140 then assigns the drone 106 to transport the second package, because the ground robot 214 is unavailable during the particular time window. In some examples, one or more of the set of drones 250 may be unavailable due to factors such as inadequate power levels or required maintenance.

In some examples, the drone management subsystem 140 can analyze and consider additional data in the selection of the drone of the set of drones 250. For example, the drone management subsystem 140 may access weather data 202, e.g., from one or more internet sources or from one or more sensors at the property 102, indicating windy weather conditions at the property 102. The drone management subsystem 140 can use the drone data 220 to determine that the rolling ground robot 214 has a greater reliability in windy conditions compared to the small aerial drone 106. The drone management subsystem 140 may determine, using the drone data 220, that wind speeds exceed a maximum wind speed for operating the small aerial drone 106. Based on the windy weather conditions and the drone data 220, the drone management subsystem 140 can select the rolling ground robot 214 to transport the package 110 to the vehicle, instead of selecting the small aerial drone 106. This can reduce a likelihood of damage to one of the drones 250, e.g., the aerial drone.

The drone management subsystem 140 assigns a drone of the set of drones 250 to perform the action for the package 110. The drone management subsystem 140 deploys the drone by sending drone commands 150 to the assigned drone of the set of drones 250. In response to receiving the drone commands 150, the drone of the set of drones 250 performs the action for the package 110. In some examples, the drone management subsystem 140 sends the drone commands 150 to the drones 250 over a long-range data link.

The drone commands 150 can include instructions for the ground robot 214 to perform one or more actions determined by the action selector 232. The drone commands 150 can include commands to scout 222 the package 110, monitor 224 the package 110, guard 226 the package 110, move 228 the package 110, or any combination of these.

In some examples, the monitoring server 120 can coordinate with other sensors and equipment at the property 102. For example, the drone commands 150 can include a command for the ground robot 214 to move the package 110 to the back door of the property 102. To access the back door of the property, the ground robot 214 may need to pass through a gate in a fence. The monitoring server 120 can send a signal to a smart lock of the gate, causing the smart lock to unlock to permit the ground robot 214 to pass through the gate.

The drone commands 150 can instruct the drone to collect the package 110 and transport the package 110 to the destination location. In some examples, the drone commands 150 include navigational guidance to guide the ground robot 214 to the destination location. The drone commands 150 can include, for example, a time of departure, a pre-programmed route, turn-by-turn guidance, GPS coordinates of a destination, or any combination of these.

In some examples, the drone management subsystem 140 or the drone of the set of drones 250 can determine to cancel a drone-assisted movement after the drone management subsystem 140 sends the drone commands 150 to the drone of the set of drones 250. For example, the drone of the set of drones 250 may be unable to lift the package 110, may run into an obstacle while attempting to transport the package, one or more conditions of the package 110 might change, or a combination of these. The obstacle can be, for example, a weather condition, an animal, or a person. In some examples, the drone of the set of drones 250 may determine that a path to the destination location is hazardous. For example, the drone of the set of drones 250 may detect high levels of walking traffic between the property 102 and the destination location. In response to determining that walking traffic is greater than a maximum threshold amount of walking traffic, the drone of the set of drones 250 can determine to return to the property 102. The drone of the set of drones 250 can transmit a message to the drone management subsystem 140 indicating that the delivery of the package 110 is canceled due to hazardous conditions.

The drone management subsystem 140 sends guidance to the drone 106. The drone management subsystem 140 can send the guidance to the drone 106, e.g., over a long-range data link. In some examples, the drone management subsystem 140 can send step-by-step guidance to the drone 106. The drone management subsystem 140 can provide the commands in real time based on drone status data 252.

In some examples, a camera, e.g., camera 104, can capture images of the drone 106 as the drone 106 maneuvers towards the dropoff location 132. The camera 104 can send the images to the drone management subsystem 140. Using the images, the drone management subsystem 140 can determine if the drone 106 is on track, or if the drone 106 requires additional guidance. Guidance can include real-time commands, e.g., "rotate to the left . . . stop . . . move forward . . . stop . . . rotate to the right."

In some examples, the drone management subsystem 140 can send prescribed directions to the drone 106 based on the scene model data 142. The prescribed directions can direct the robot to move a specified distance, turn to a certain direction, etc. An example set of prescribed directions can be, "from the street, proceed five feet northeast, then turn twenty-three degrees clockwise, then proceed two feet, then stop." In some examples, the prescribed directions can include a series of GPS-coordinate waypoints.

In some examples, the drone 106 can transfer maneuvering control to the drone management subsystem 140. For example, the drone 106 may provide access to a control application programming interface (API) of the drone 106. The drone 106 can then be controlled remotely by the drone management subsystem 140.

In some examples, the drone management subsystem 140 can send a signal to the drone 106 when the drone 106 reaches the destination, e.g., the porch 111. In response to receiving the signal, the drone 106 can drop off the package at the destination. Upon delivery of the package, the camera 104, the drone 106, or both, may capture an image of the package at the destination. In some examples, the camera 104 can send a confirmation message to the drone 106, to the drone management subsystem 140, and/or to a mobile device of the resident, indicating that the package has been received at the designated destination. The confirmation message may include the location of the destination, e.g., "front porch," and an image of the package at the destination. The camera 104 can then monitor and track the package using video analysis until the package is picked up by a resident of the property 102.

In some examples, the monitoring server 120 can send a drone deployment notification 260 to the resident 116 of the monitoring server 120. The drone deployment notification 260 can notify the resident 116 that a drone has been deployed to perform an action for the package 110. In some examples, the drone deployment notification 260 can include images of the package 110 before and after performing the action.

FIG. 3 is a flow diagram of an example process 300 for fetching and guarding packages using drones. The process

300 can be used by the monitoring server 120. The order of steps in the process 300 is illustrative only, and the steps can be performed in different orders. In some implementations, the process 300 can include additional steps, fewer steps, or some of the steps can be divided into multiple steps. For instance, one or more of the steps can be performed with video clips instead of or in addition to video images. In some examples, the steps of the process 300 can be performed in parallel. Although the process 300 is described with reference to drones, the process 300 can use any other appropriate type of robot.

The process 300 includes determining a characteristic of the package (302). For example, the package modeler 134 can generate the package model 136. The package model 136 can indicate a characteristic of the package 110. The characteristic of the package can be, for example, a size, shape, fragility, or value of the package 110.

The process 300 includes determining a risk score for a package at a first location (304). The first location can be, for example, a location to which the package was delivered, a location at which the package is awaiting pickup, or both. For example, the risk assessment engine 122 can determine the risk score 138 for the package 110 at the location 118. In some implementations, the system can determine the condition of the package at the time that the package is delivered. For example, when a package is delivered, the system can send a drone to record the package's condition at that time, e.g., whether the package is wet, damaged, temperature of the package, or a combination of these. Thus, the system can differentiate damage that happened pre-delivery from damage that happened after delivery.

In some implementations, determining the risk score for the package at the first location can include determining the risk score for the package using the first location and the characteristic of the package. In some implementations, determining the risk score for the package can include determining a damage risk score for the package using the first location, the characteristic of the package, and weather data for the first location. A damage risk score can indicate a likelihood that the package will be damaged. A theft risk score can indicate a likelihood that the package will be stolen. In some implementations, determining the risk score for the package can include determining a theft risk score for the package using the first location, the characteristic of the package, and property schedule data for a property that includes the first location. In some examples, the risk score can be a combination of the damage risk score and the theft risk score, e.g., a sum or product.

In some implementations, determining the risk score for the package can include determining the risk score using a machine learning model trained on historical package data including conditions of packages from historical package deliveries or pick-ups. In some implementations, the system can obtain features of the property, features of the package, or a combination of both, and can provide these features as input to a trained machine learning model that is configured to process these features and to generate a risk score. The system can suggest delivery locations or pickup locations using the risk scores of the locations at the property. In some implementations, the system can determine a respective risk score for each of a plurality of candidate pickup or delivery locations at the property. In some implementations, the system can determine a location specific risk score for each candidate location using both information about the location and information about the package.

In some implementations, the system can generate training examples to train the machine learning model that is configured to generate a risk score. Each training example can include a training input and a ground truth label. The training input can include features of the property, features of the package, or a combination of both. The ground truth label can include a ground truth risk score generated using risk factors, package outcome data, user reporting data, or a combination of these. In some implementations, the system can generate additional training data after the machine learning model is trained and deployed. The system can use at least the additional training data to retain the machine learning model.

For example, the system can obtain features of the property using a robot or a sensor to examine a series of locations specified by a user or to survey a property automatically. The system can generate features of the property by assessing the environment, such as sun exposure and precipitation exposure according to an overhead cover, a location's height off the ground, line of sight from the street, whether a location is secured by a gate, surface and air temperatures, etc. In some implementations, the features of the property can change over time. In some implementations, the features of the property at a future time may not be predictable from a single measurement of the features at a previous time. In some implementations, the robot can continue to monitor the locations at the property to better characterize and update the features. The system can provide the updated features to a machine learning model to generate updated risk scores at the locations or can generate updated training examples to retrain or otherwise update a machine learning model. In some examples, the system can obtain features of the package, such as structure, weight, and appearance of the package. The system can generate a training input using the features of the property, the features of the package, or a combination of both.

In some implementations, the system can generate a ground truth label for a training input using risk factors, package outcome data, user reporting data, or a combination of these. In some examples, the system can monitor the package for damage, theft, temperature, etc., to generate outcome data of the package indicating a level of risk. In some examples, the system can receive user reporting data that indicates one or more impacts to the contents of the package. For example, a robot can obtain information, e.g., features of a set of grocery bags, indicating their appearance and that one of the bags was significantly cooler than the others at delivery time, but increased in temperature by 10 degrees by the time it was picked up. The system can receive user reporting data indicating impacts to the contents of the bags, e.g., that their ice cream melted. The system can generate a training input including the features of the grocery bags, and the system can generate a corresponding ground truth risk score for the training input according to the user report data, e.g., damage to the ice cream. The system can train or retain the machine learning model for risk prediction. Thus, using the risk score generated by the trained or retrained machine learning model, the system can prioritize moving a bag to a cooler spot available.

In some implementations, the observations, e.g., features of the property, can be site-specific, and the machine learning model trained on the observations at a specific property can only be applied to the specific property. For example, the site-specific features can be that one part of the porch is near a poorly insulated wall and tends to be closer to room temperature. In some implementations, observations at a property can be shared (anonymously) across sites. Thus, the system can generate training examples using data from multiple properties and can use the training examples from the multiple properties to train a machine learning model for risk prediction and improve the performance of the machine learning model. After training is completed, the machine learning model can be used at one property or across multiple properties.

The process 300 includes, using the risk score and the characteristic of the package, determining whether to perform an action for the package (306). For example, the drone management subsystem 140 can determine, based on the risk score 138 and the package model 136, whether to perform an action for the package 110. The drone management subsystem 140 can determine to scout 222, monitor 224, guard 226, or move 228 the package 110, or any combination of these. In some examples, the drone management subsystem 140 can determine that the risk score 138 satisfies, e.g., is equal to or greater than a threshold risk score, and in response, determine to move the package 110 from the location 118 to the porch 111.

In some implementations, determining whether to perform the action for the package can include determining, using the risk score, the characteristic of the package, or both, whether to perform the action for the package to reduce at least one of a theft risk or a damage risk of the package.

The process 300 includes, in response to determining to perform the action for the package, assigning a robot to perform the action. In some implementations, assigning the robot to perform the action can include selecting the robot from a set of candidate robots using the characteristic of the package and respective characteristics of the candidate robots. The process 300 includes deploying the robot to perform the action.

In some implementations, determining to perform the action for the package can include determining, using the risk score and the characteristic of the package, to move the package to a second location. The process 300 can include, in response to determining to move the package to a second location, assigning a robot to move the package to the second location (308). For example, the drone management subsystem 140 can assign the drone 106 to move the package 110 from the location 118 to the porch 111.

The process 300 can include deploying the robot to move the package to the second location (310). For example, the drone management subsystem 140 can send drone commands 150 to cause the drone 106 to deploy to move the package 110 from the location 118 to the porch 111.

In some implementations, determining to perform the action for the package can include determining, using the risk score and the characteristic of the package, to guard the package at the first location. The process 300 can include, in response to determining to guard the package at the first location, assigning a robot to guard the package at the first location (312). For example, the drone management subsystem 140 can assign the drone 218 to guard the package 110 at the location 118.

The process 300 can include deploying the robot to guard the package at the first location (314). For example, the drone management subsystem 140 can send drone commands 150 to cause the drone 218 to deploy to guard the package 110 at the location 118. In some examples, the system can use video analytics applied to images or video data obtained at the area near the package and can alert a user, activate a sound or a light, or a combination of these, if any people (e.g., a stranger) approaches the package. In some implementations, the system can monitor the physical condition of the package, e.g., whether the package has an appropriate temperature, whether the package is dry, or both.

In some implementations, determining to perform the action for the package can include determining, using the risk score and the characteristic of the package, to monitor the package at the first location. Assigning the robot to perform the action can include, in response to determining to monitor the package at the first location, assigning the robot to monitor the package at the first location. Deploying the robot to perform the action can include deploying the robot to monitor the package at the first location.

In some implementations, determining to perform the action for the package can include determining, using the risk score and the characteristic of the package, to scout a route for moving the package from the first location to a second location and to move the package from the first location to the second location along the route. Assigning the robot to perform the action can include, in response to determining to scout the route, assigning a first robot to scout the route for moving the package from the first location to the second location and assigning a second robot to move the package from the first location to the second location along the route. Deploying the robot to perform the action can include deploying the first robot to scout the route for moving the package from the first location to the second location and deploying the second robot to move the package from the first location to the second location along the route.

In some implementations, the system can use a robot to scout the route for moving the package from the first location to a second location. Using the result of the scout, the system can determine a risk score for the route. The risk score for the route can indicate a likelihood that it is safe, convenient, efficient, or a combination of these, to deliver the package along the route. If the risk score satisfies a threshold, the system can assign a robot to move the package along the route. If the risk score does not satisfy the threshold, the system can pick a different route for moving the package from the first location to the second location, or the system can select a different second location.

The process 300 optionally includes determining to skip performing an action for the package (314). For example, the drone management subsystem 140 can determine to skip performing an action for the package 110.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the monitoring system that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used.

Figure 4:
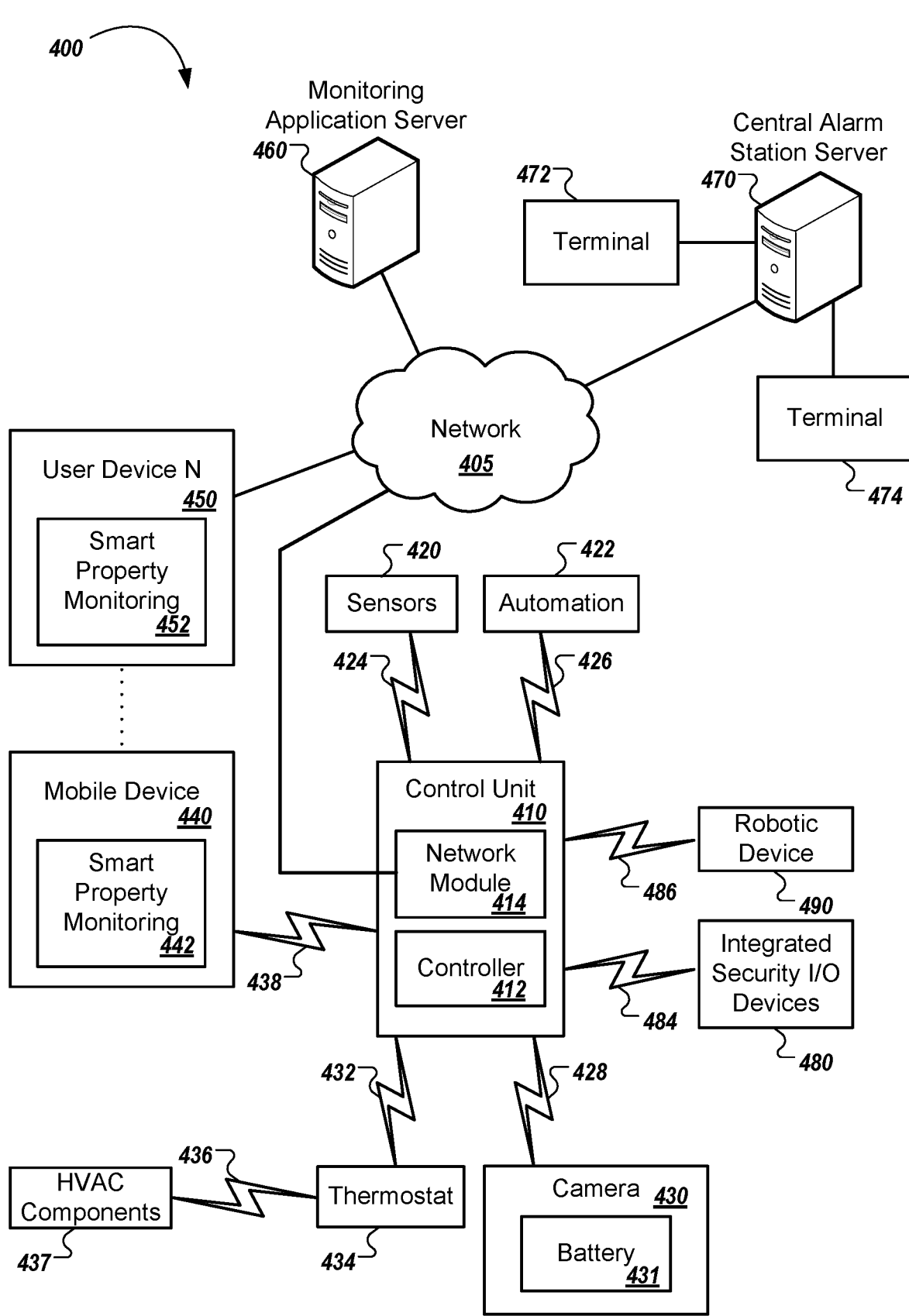
FIG. 4 is a diagram illustrating an example of a monitoring system.

FIG. 4 is a diagram illustrating an example of a property monitoring system 400. The property monitoring system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 420 can include a radio-frequency identification (RFID) sensor that identifies a particular article that includes a pre-assigned RFID tag.

The control unit 410 communicates with the module 422 and a camera 430 to perform monitoring. The module 422 is connected to one or more devices that enable property automation, e.g., home or business automation. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol). Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430. The camera 430 can include one or more batteries 431 that require charging.

A drone 490 can be used to survey the electronic system 400. In particular, the drone 490 can capture images of each item found in the electronic system 400 and provide images to the control unit 410 for further processing. Alternatively, the drone 490 can process the images to determine an identification of the items found in the electronic system 400.

The camera 430 may be a video/photographic camera or other type of optical sensing device configured to capture images. For instance, the camera 430 may be configured to capture images of an area within a property monitored by the control unit 410. The camera 430 may be configured to capture single, static images of the area or video images of the area in which multiple images of the area are captured at a relatively high frequency (e.g., thirty images per second)

or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more module 422.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 can include, for example, the set of drones 250. The robotic devices 490 may be any type of robots that are capable of moving and taking actions that assist in security monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a property charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the property. The robotic devices 490 may be configured to navigate to the charging stations after completion of tasks needed to be performed for the property monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the property monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the module 422, the camera 430, the thermostat 434, and the integrated security devices 480 may communicate with the controller 412 over communication links 424, 426, 428, 432, 438, 484, and 486. The communication links 424, 426, 428, 432, 438, 484, and 486 may be a wired or wireless data pathway configured to transmit signals from the sensors 420, the module 422, the camera 430, the thermostat 434, the drone 490, and the integrated security devices 480 to the controller 412. The sensors 420, the module 422, the camera 430, the thermostat 434, the drone 490, and the integrated security devices 480 may continuously transmit sensed values to the controller 412, periodically transmit sensed values to the controller 412, or transmit sensed values to the controller 412 in response to a change in a sensed value. In some implementations, the drone 490 can communicate with the monitoring application server 460 over network 405. The drone 490 can connect and communicate with the monitoring application server 460 using a Wi-Fi or a cellular connection.

The communication links 424, 426, 428, 432, 438, 484, and 486 may include a local network. The sensors 420, the module 422, the camera 430, the thermostat 434, the drone 490 and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Power-line" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 410. In this example, the monitoring application server 460 may exchange electronic communications with the network module 414 included in the control unit 410 to receive information regarding events (e.g., alerts) detected by the control unit 410. The monitoring application server 460 also may receive information regarding events (e.g., alerts) from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system 400 and perform analysis of sensor and image data received from the monitoring system 400. Based on the analysis, the monitoring application server 460 may communicate with and control aspects of the control unit 410 or the one or more user devices 440 and 450.

The monitoring application server 460 may provide various monitoring services to the system 400. For example, the monitoring application server 460 may analyze the sensor, image, and other data to determine an activity pattern of a resident of the property monitored by the system 400. In some implementations, the monitoring application server 460 may analyze the data for alarm conditions or may determine and perform actions at the property by issuing commands to one or more components of the system 400, possibly through the control unit 410.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440 and 450 are devices that host and display user interfaces. For instance, the user device 440 is a mobile device that hosts or runs one or more native applications (e.g., the smart property application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart property application 442. The smart property application 442 refers to a software/firmware program running on the corresponding mobile device that enables the user interface and features described throughout. The user device 440 may load or install the smart property application 442 based on data received over a network or data received from local media. The smart property application 442 runs on mobile devices platforms, such as iPhone, iPod touch, Blackberry, Google Android, Windows Mobile, etc. The smart property application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart property user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the module 422, the camera 430, and the robotic devices, e.g., that can include the drone 490. The one or more user devices 440 and 450 receive data directly from the sensors 420, the module 422, the camera 430, and the robotic devices and send data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
capturing, by a sensor at a property and that has a field of view of a first location at a property at which a package is physically located, sensor data;
determining, by the sensor and using the sensor data from the sensor, a characteristic of the package currently at the first location at the property and at which the package is physically located;
determining, by the sensor, a risk score for the package using first data for the package and second data for the first location at which the package is physically located at the property;
determining, by the sensor and using the risk score and the characteristic of the package, whether to perform an action for the package that is physically located at the first location at the property;
in response to determining to perform the action for the package, autonomously assigning, by the sensor, a robot for the property to perform the action for the package; and
autonomously transmitting, by the sensor and to the robot and using a network, one or more instructions that cause the robot to perform the action for the package at the property.

2. The method of claim 1, wherein determining to perform the action for the package comprises determining, using the risk score and the characteristic of the package, whether to perform the action for the package to reduce at least one of a theft risk or a damage risk of the package.

3. The method of claim 1, wherein determining the risk score for the package at the first location comprises determining the risk score for the package using the first location and the characteristic of the package.

4. The method of claim 1, wherein determining the risk score for the package comprises determining a damage risk score for the package using the first location, the characteristic of the package, and weather data for the first location.

5. The method of claim 1, wherein determining the risk score for the package comprises determining a theft risk score for the package using the first location, the characteristic of the package, and property schedule data for the property that includes the first location.

6. The method of claim 1, wherein determining the risk score for the package comprises determining the risk score using a machine learning model trained on historical package data comprising conditions of packages from historical package deliveries for packages that were successfully delivered or packages that were placed at a respective property for pick-up.

7. The method of claim 1, wherein:

determining to perform the action for the package comprises determining, using the risk score and the characteristic of the package, to move the package to a second location;

assigning the robot to perform the action comprises, in response to determining to move the package to the second location, assigning the robot to move the package to the second location; and transmitting the one or more instructions to the robot comprises transmitting the one or more instructions that cause the robot to move the package to the second location.

8. The method of claim 1, wherein:

determining to perform the action for the package comprises determining, using the risk score and the characteristic of the package, to guard the package at the first location;

assigning the robot to perform the action comprises, in response to determining to guard the package at the first location, assigning the robot to guard the package at the first location; and transmitting the one or more instructions to the robot comprises transmitting the one or more instructions that cause the robot to guard the package at the first location.

9. The method of claim 1, wherein:

determining to perform the action for the package comprises determining, using the risk score and the characteristic of the package, to monitor the package at the first location;

assigning the robot to perform the action comprises, in response to determining to monitor the package at the first location, assigning the robot to monitor the package at the first location; and transmitting the one or more instructions to the robot comprises transmitting the one or more instructions that cause the robot to monitor the package at the first location.

10. The method of claim 1, wherein:

determining to perform the action for the package comprises determining, using the risk score and the characteristic of the package, to scout a route for moving the package from the first location to a second location and to move the package from the first location to the second location along the route;

assigning the robot to perform the action comprises, in response to determining to scout the route, assigning a first robot to scout the route for moving the package from the first location to the second location and assigning a second robot to move the package from the first location to the second location along the route; and transmitting the one or more instructions to the robot comprises transmitting one or more first instructions that cause the first robot to scout the route for moving the package from the first location to the second location and transmitting one or more second instructions that cause the second robot to move the package from the first location to the second location along the route.

11. The method of claim 1, wherein assigning the robot to perform the action comprises:

selecting the robot from a set of candidate robots using the characteristic of the package and respective characteristics of the candidate robots.

12. The method of claim 1, wherein the package was placed at the property for pick-up or was already delivered.

13. A monitoring system comprising a sensor and one or more storage devices on which are stored instructions that are operable, when executed by the sensor at a property and that has a field of view of a first location at a property at which a package is physically located, to cause the sensor to perform operations comprising:

capturing sensor data;

determining, using the sensor data, a characteristic of the package currently at the first location at the property and at which the package is physically located;

determining a risk score for the package using first data for the package and second data for the first location at which the package is physically located at the property;

determining, using the risk score and the characteristic of the package, whether to perform an action for the package that is physically located at the first location at the property;

in response to determining to perform the action for the package, autonomously assigning a robot for the property to perform the action for the package; and autonomously transmitting, to the robot and using a network, one or more instructions that cause the robot to perform the action for the package at the property.

14. The monitoring system of claim 13, wherein determining to perform the action for the package comprises determining, using the risk score and the characteristic of the package, whether to perform the action for the package to reduce at least one of a theft risk or a damage risk of the package.

15. The monitoring system of claim 13, wherein determining the risk score for the package at the first location comprises determining the risk score for the package using the first location and the characteristic of the package.

16. The monitoring system of claim 13, wherein determining the risk score for the package comprises determining a damage risk score for the package using the first location, the characteristic of the package, and weather data for the first location.

17. The monitoring system of claim 13, wherein determining the risk score for the package comprises determining a theft risk score for the package using the first location, the characteristic of the package, and property schedule data for the property that includes the first location.

18. The monitoring system of claim 13, wherein determining the risk score for the package comprises determining the risk score using a machine learning model trained on historical package data comprising conditions of packages from historical package deliveries for packages that were successfully delivered or packages that were placed at a respective property for pick-up.

19. The monitoring system of claim 13, wherein:

determining to perform the action for the package comprises determining, using the risk score and the characteristic of the package, to guard the package at the first location;

assigning the robot to perform the action comprises, in response to determining to guard the package at the first location, assigning the robot to guard the package at the first location; and transmitting the one or more instructions to the robot comprises transmitting the one or more instructions that cause the robot to guard the package at the first location.

20. A non-transitory computer storage medium encoded with instructions that, when executed by a sensor at a property and that has a field of view of a first location at a property at which a package is physically located, cause the
sensor to perform operations comprising:

capturing sensor data;

determining, using the sensor data, a characteristic of the
package currently at the first location at the property
and at which the package is physically located;

determining a risk score for the package using first data
for the package and second data for the first location at
which the package is physically located at the property;

determining, using the risk score and the characteristic of
the package, whether to perform an action for the
package that is physically located at the first location at
the property;

in response to determining to perform the action for the
package, autonomously assigning a robot for the prop-
erty to perform the action for the package; and autonomously transmitting, to the robot and using a
network, one or more instructions that cause the robot
to perform the action for the package at the property.

* * * * *